March 1, 1938.  J. M. BIERER  2,110,076

MACHINE FOR VULCANIZING ENDLESS BELTING

Filed Feb. 19, 1936  5 Sheets-Sheet 1

INVENTOR
JOHN M. BIERER

Fig. 6.

March 1, 1938.  J. M. BIERER  2,110,076

MACHINE FOR VULCANIZING ENDLESS BELTING

Filed Feb. 19, 1936  5 Sheets-Sheet 5

INVENTOR
JOHN M. BIERER
BY
Kenway & Witter.
ATTORNEYS

Patented Mar. 1, 1938

2,110,076

UNITED STATES PATENT OFFICE 2,110,076

MACHINE FOR VULCANIZING ENDLESS BELTING

John M. Bierer, Newton, Mass., assignor to Boston Woven Hose and Rubber Company, Cambridge, Mass., a corporation of Massachusetts Application February 19, 1936, Serial No. 64,724

31 Claims. (Cl. 18—6).

This invention relates to vulcanizing machines and more particularly to machines for vulcanizing endless belting having rubber or other material in its composition which requires vulcanization or heat curing in producing the finished product.

It is well settled that belting vulcanized in endless condition is superior in wear to belting which is vulcanized and then spliced and on this account certain important industries insist upon the employment of endless belting. Heretofore it has been impossible to impart a uniform cure to such belting or to rid endless belting of the defects of nonuniform curing. Endless belting as heretofore made has been cured between heated surfaces in a step-by-step manner which has necessitated an overlapping of the treated areas with resulting over-cured spots in the belting. In use these over-cured spots, or any areas which are denser or harder than the body of the belting, show up as defects and wear out before the rest of the belt. Continuous vulcanizing machines have been used heretofore for imparting a uniform cure to belting that is not endless, but in such machines a free end of the belting must be led to the heated vulcanizing surface and it is, of course, not possible to produce endless belting in this manner.

An inherent difficulty in continuously vulcanizing endless belting lies in the fact that once the belting is engaged with the heated surface or between cooperating curing surfaces before the application of heat, the problem arises of equal time exposure for all the parts of the belting in contact with the surfaces. This is further complicated by the fact that when uncured or partially cured belting has once been brought into contact with a heated curing surface it cannot be readily separated therefrom until it has been cured to a predetermined degree, that is to say, at least one-third cured. My present invention contemplates a novel vulcanizing machine constructed to overcome these difficulties and to solve the problem of uniformly vulcanizing or curing endless belting.

An important feature of the invention resides in a novel vulcanizing drum so constructed that its vulcanizing periphery may be heated in sections independently of each other and cooperating with this drum there may be employed a heating jacket also constructed to be heated in sections so that it may cooperate with the sections of the drum. The endless belt to be cured may be engaged with the drum beneath an endless tensioning band and the jacket while the drum and jacket are in unheated condition, the band and belting passing around a substantial arcuate portion of the drum and forming an open loop leaving an arcuate portion or segment of the drum free from the band and belting. After the belting is in vulcanizing position on the drum and before the machine is started, this free segment of the drum and the cooperating section of the jacket are heated, the machine being then started. The belt thereupon becomes engaged with this heated portion of the drum beneath the cooperating heated jacket, and succeeding sections of the drum and jacket are successively brought to heated condition as the machine continues to operate. In this manner the entire belt is fully and uniformly vulcanized during its passage around and in contact with the drum and no part thereof is under or over treated during such passage. When the vulcanized portion of the belt again reaches the vulcanizing drum, cooling water is passed into the drum and jacket whereby cooling the same for the reception of such belt portion without further continuing vulcanizing thereof. A vulcanizing drum constructed thus uniformly to cure endless belting comprises a very important feature of the invention.

The provision of means providing for the convenient application of the endless belt to and its removal from the vulcanizing drum and a cooperating roller, which respectively support the belt at its opposite ends, comprises another important feature of the invention. This means is herein shown as readily detachable bearings, one for supporting the outer end of the vulcanizing drum and another for supporting the outer end of the roller, the bearings being so mounted in the machine that they can be withdrawn from the drum or roller and moved laterally to a position freely clearing the drum and roller and thus facilitate the application of an endless belt to and its removal from these members.

A further feature of the invention consists of a heating jacket which is arranged to cooperate in a novel manner with the vulcanizing drum or with the pressure band upon the drum to heat the outer face of the material being vulcanized. This jacket is preferably formed in relatively independent sections which sections may be independently heated and which are supported for movement toward and from the drum. As herein shown the sections may be normally and resiliently urged away from the drum and means may be provided for forcing and holding them toward and preferably in contact with the drum or the pressure band associated therewith. As thus arranged the jacket may be conveniently positioned away from the drum to provide clearance for applying the belt to and removing it from the drum and also thereafter be brought to and held in position to transmit heat effectively from the band to the surface of the material opposite to that which is heated directly by the drum.

These and other features of the invention will be best understood and appreciated from the following description of a preferred embodiment thereof, selected for purposes of illustration, and shown in the accompanying drawings, in which.

The improved machine herein illustrated includes in its structure a vulcanizing drum 10 mounted to rotate on a horizontal axis between two heavy side frame members 12 supported on a base 14. The endless belt B to be cured is supported on and between the vulcanizing drum and a roller 15 mounted in a secondary carriage 16 which is in turn mounted on a main carriage 17 supported on a track 18. The main carriage 17 may be traversed along its track to a position approximately the length of the belt B and the secondary carriage 16 may then be traversed along the track 20 of the carriage 17 to place the belt under the desired tension. This traversing of the secondary carriage 16 is accomplished through the use of a screw 22 in threaded engagement therewith and operatively connected to a motor 23 through a driving chain 24, all of which are parts of the main carriage 17.

Figure 5:
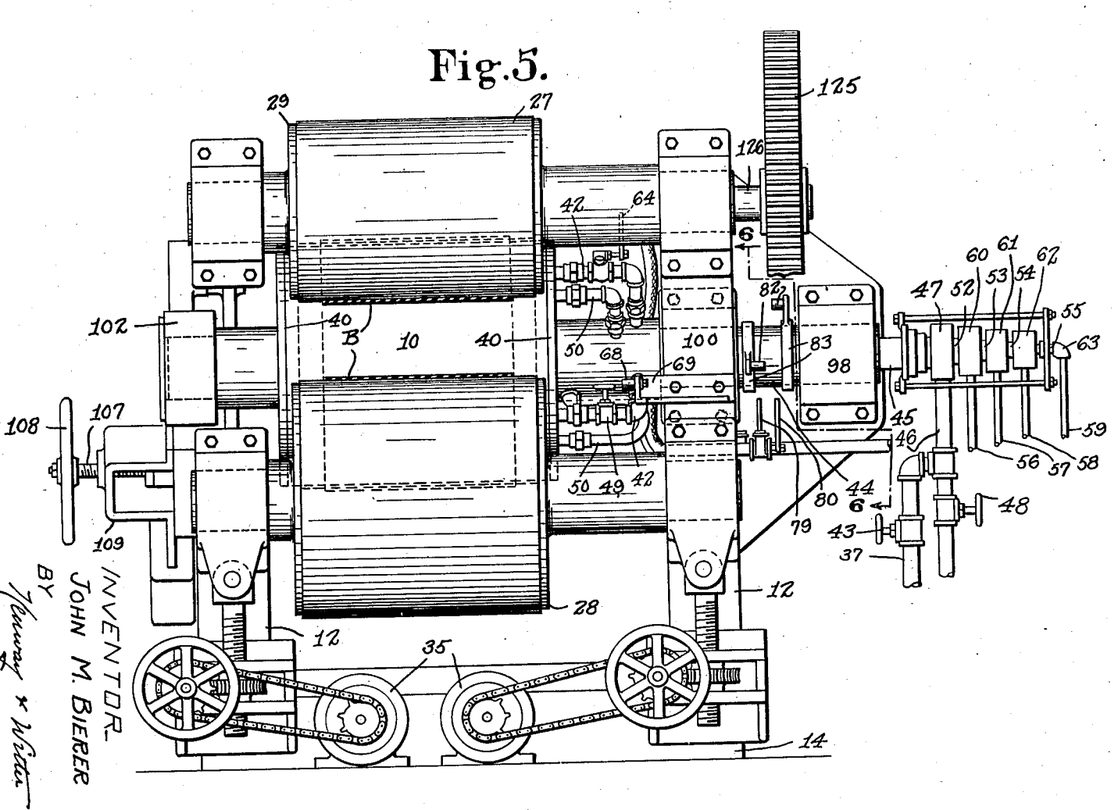
Fig. 5 is a view in end elevation of the machine, viewed from the line 5—5 of Fig. 1.

It will be noted that the belt B passes around a substantial arcuate portion of the vulcanizing drum 10 and forms an open loop leaving an arcuate portion or segment of the drum free from the belt at 26. Also cooperating with the vulcanizing drum 10 is an endless tension band 27 mounted to pass around the said substantial arcute portion of the drum, over two cooperating drums or rolls 28 and 29 and from thence over a tensioning roll 30. The roll 30 is supported for movement along guideways 32, a hydraulic cylinder 33 acting against springs 34 being provided for moving this roll away from the drum 10 and thus placing the band under desired tension. It will be apparent that the belt B is located between the vulcanizing drum and the band and that the latter holds the belt under pressure in firm contact with the drum. The roll 28 may also, if desired, act as a pressure roll for compressing the belt as it passes onto the vulcanizing drum, adjustment of the roll being provided through the use of motors 35 and suitable driving connections therefrom, as illustrated in Fig. 5, and all as more fully described in my copending application Ser. No. 10,005 filed March 8, 1935.

Figures 2, 3, 4:
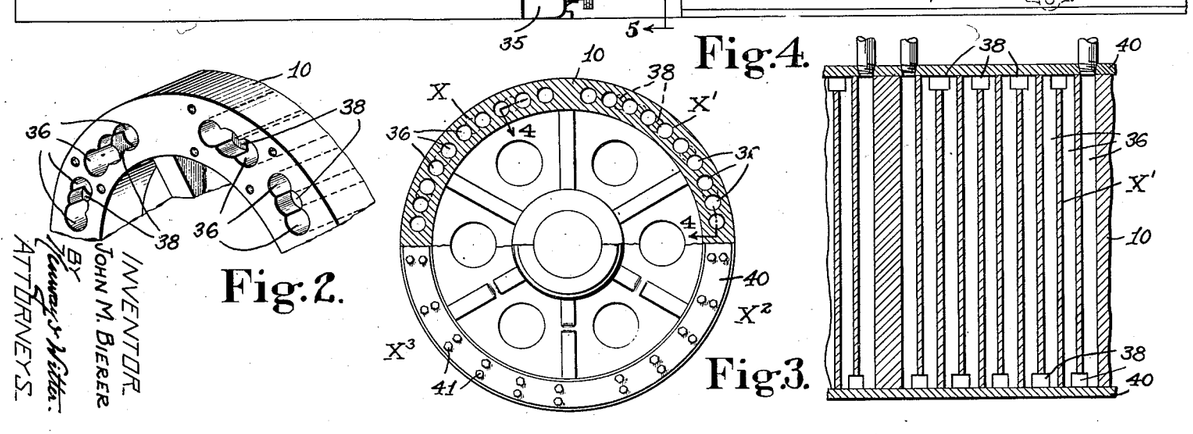
Fig. 2 is a perspective view of a portion of the vulcanizing drum.
Fig. 3 is a view in end elevation of the vulcanizing drum, partially in transverse section.
Fig. 4 is a sectional view on the line 4—4 of Fig. 3.

As heretofore stated, the drum 10 is constructed to have its vulcanizing periphery heated in sections independently of each other and I have herein shown such heating as being effected by steam. As illustrated in Fig. 4, the drum is divided into four such sections, X, $X^1$, $X^2$, $X^3$, each of which sections is in length of circumference substantially equal to or less than the free arcuate section of the drum indicated at 26. Each such section is chambered by a plurality of bores 36 interconnected by shallow end bores 38 and the ends of these bores are closed by flat plates 40 secured to the drum by stud bolts 41. Steam is admitted to each of the chambers by a pipe 42 threaded into one end thereof and having its opposite end extending through the outer tube 44 of the drum axle and threaded into an inner tube 45. Steam is supplied to the outer end of the tube 45 by means of a supply pipe 46 and stuffing box connection 47, as shown in Fig. 5, and a valve 48 is provided for a manual control therefor. That pipe 42 which leads to section X of the drum is provided with a controlling valve 49. Steam is permitted to escape from the other ends of the four chambers through four pipes 50 respectively threaded thereinto, these four pipes being respectively placed in communication with pipes 52, 53, 54, and 55 concentrically arranged within the tube 45. Pipes 56, 57, 58, and 59 and connections 60, 61, 62, and 63 are placed respectively in communication with the said four pipes.

When the valves 48 and 49 are opened steam flows into the tube 45 and directly into the chambered section X of the vulcanizing drum. Valves operated by handles 64, 65, and 66 are provided in the pipes 42 leading into chambered sections $X^1$, $X^2$, and $X^3$, whereby steam entrance into these chambers may be controlled. These valves are adapted to be automatically opened at predetermined points in the rotation of the vulcanizing drum by a pin 68 (see Fig. 5) carried on an angular plate 69 mounted on one of the side members 12, the pin being located in the path of movement of the valve handles. A cold water pipe 37 having a valve 43 therein is in communication with the pipe 46 outside the valve 48.

Figure 6:
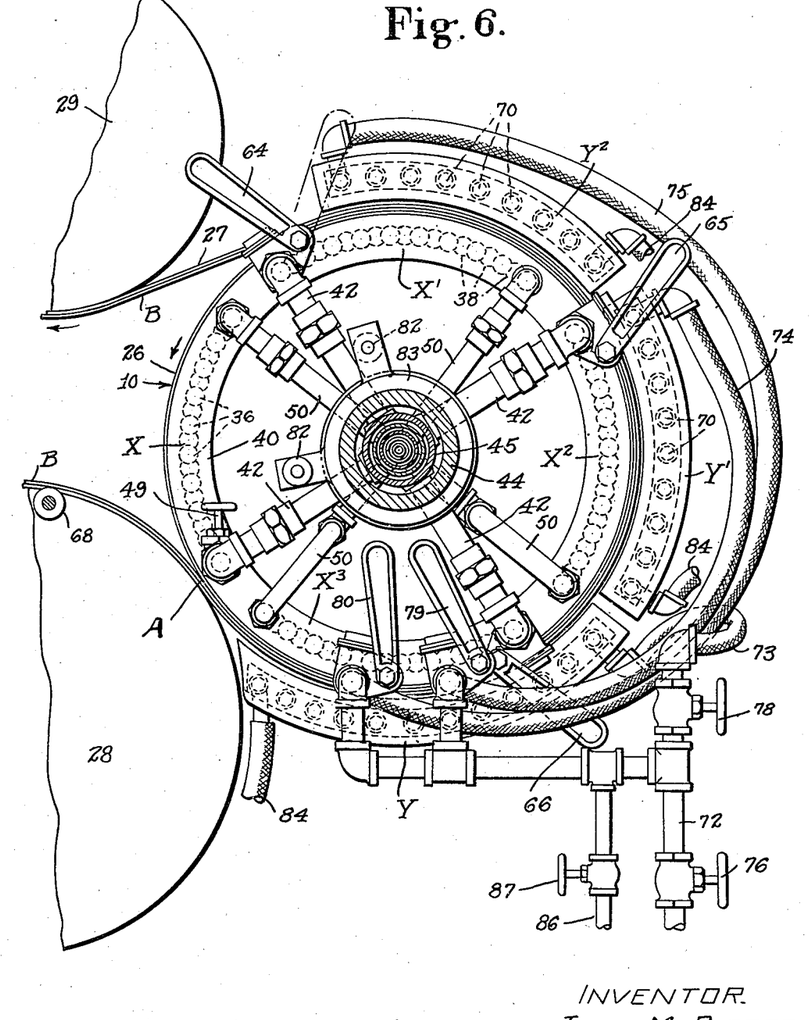
Fig. 6 is a view in rear elevation of the vulcanizing drum and related parts taken in section on the line 6—6 of Fig. 5, and on an enlarged scale.

Cooperating with the tensioning band 27 and that portion of the drum 10 engaged by the band is a heating jacket comprising three sections Y, $Y^1$, and $Y^2$. Each such section is provided therein with steam pipes 70 and steam is supplied thereto from a pipe 72 and connections therefrom including hose connections 73, 74, and 75 all as shown in Fig. 6. A hand valve 76 in the pipe 72 controls the main steam supply and a hand valve 78 controls the passage of steam to the jacket section Y. Other valves with handles 79 and 80 control the passage of steam to the jacket sections $Y^1$ and $Y^2$. These two valves are adapted to be automatically opened at predetermined points in the rotation of the vulcanizing drum by pins 82 carried on rings 83 mounted on the tube 45, the pins being located in the path of movement of the valve handles and the rings being rotatably adjusted to the proper positions on the tube to effect the predetermined valve openings. Exit pipe connections 84 are provided on the jacket sections at the ends thereof opposite to the steam supply connections 73, 74, and 75. A cold water pipe 86 with a hand valve 87 therein is also in communication with the steam pipe inside its main valve 76.

Figures 10, 11, 12:
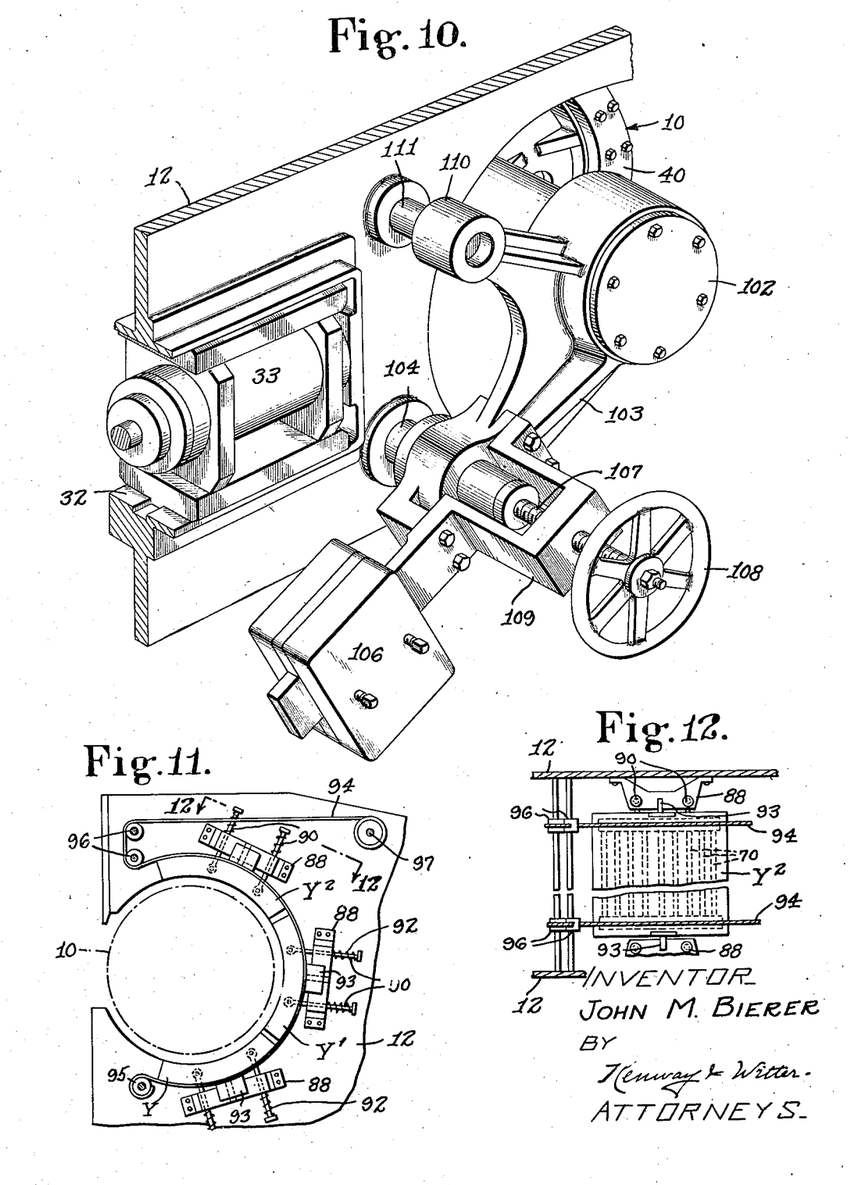
Fig. 10 is a perspective view of the detachable bearing for the vulcanizing drum.
Fig. 11 is a fragmentary view in elevation and on a small scale of the heating jacket cooperating with the vulcanizing drum.
Fig. 12 is a fragmentary view thereof taken on the line 12—12 of Fig. 11.

As illustrated in Figs. 11 and 12, each of the jacket sections Y, Y¹, and Y² is preferably mounted for independent movement toward and from the vulcanizing drum. Located respectively at opposite ends of each jacket section are two brackets 88 secured to the side walls 12. Two rods 90 extending through each bracket have their inner ends connected to the ends of the jacket section. Springs 92 located upon the outer ends of the rods normally draw the rods and the jacket section outwardly away from the drum, the sections being supported and guided in such movement by plates 93 carried thereby and sliding within slots in the brackets. Any suitable means, such as cables 94, may be provided for forcing the jacket sections inwardly. One end of each of these cables is anchored by a pin 95 set in the side frame 12 and from thence the cable passes around the jacket sections, over guide rolls 96 and onto a winding drum fast to the inner end of a shaft 97 journalled in the side frame 12. The cables may be tightened to any desired degree by means of hand wheels on the shaft 97 and thus all the sections are forced with suitable pressure inwardly into contact with the tension band 27 as it passes about the vulcanizing drum, any suitable means being provided to hold the shafts 97 against reverse rotation.

The axle on which the vulcanizing drum is carried is supported in spaced bearings 98 and 100 at the rear side of the drum and by a bearing 102 at the front side thereof. It will be apparent that the endless belt B can be placed on and removed from the drum 10 only by sliding the belt over one end of the drum. To facilitate for this operation, the front bearing 102 is so mounted that it is readily detachable from the drum and movable laterally to a position in which it freely clears the drum. This mounting comprises a frame 103 pivotally supported on a horizontal stud 104 and utilizing a counter-weight 106 for counter-balancing the bearing. Mechanism such as a screw 107 operated by a hand wheel 108 and cooperating with the frame and the body of the machine is provided at the pivotal axis of the frame for moving the frame inwardly and outwardly on the stud 104, the screw being journalled in the end of the stud and threaded in a U-shaped portion 109 of the movable frame. When the frame and bearing are in their innermost and operative positions, a perforated arm 110 on the frame engages over a guide stud 111 in the side frame 12, thereby giving additional support to the frame and bearing and securely supporting the front end of the axle. When it is desired to apply a belt to or remove it from the drum, the screw 107 is rotated to draw the movable frame and bearing outwardly a sufficient distance to clear the stud 111 and the end of the axle. The frame and bearing are thereupon swung laterally to a position freely clearing the end of the axle.

Figures 7, 8, 9:
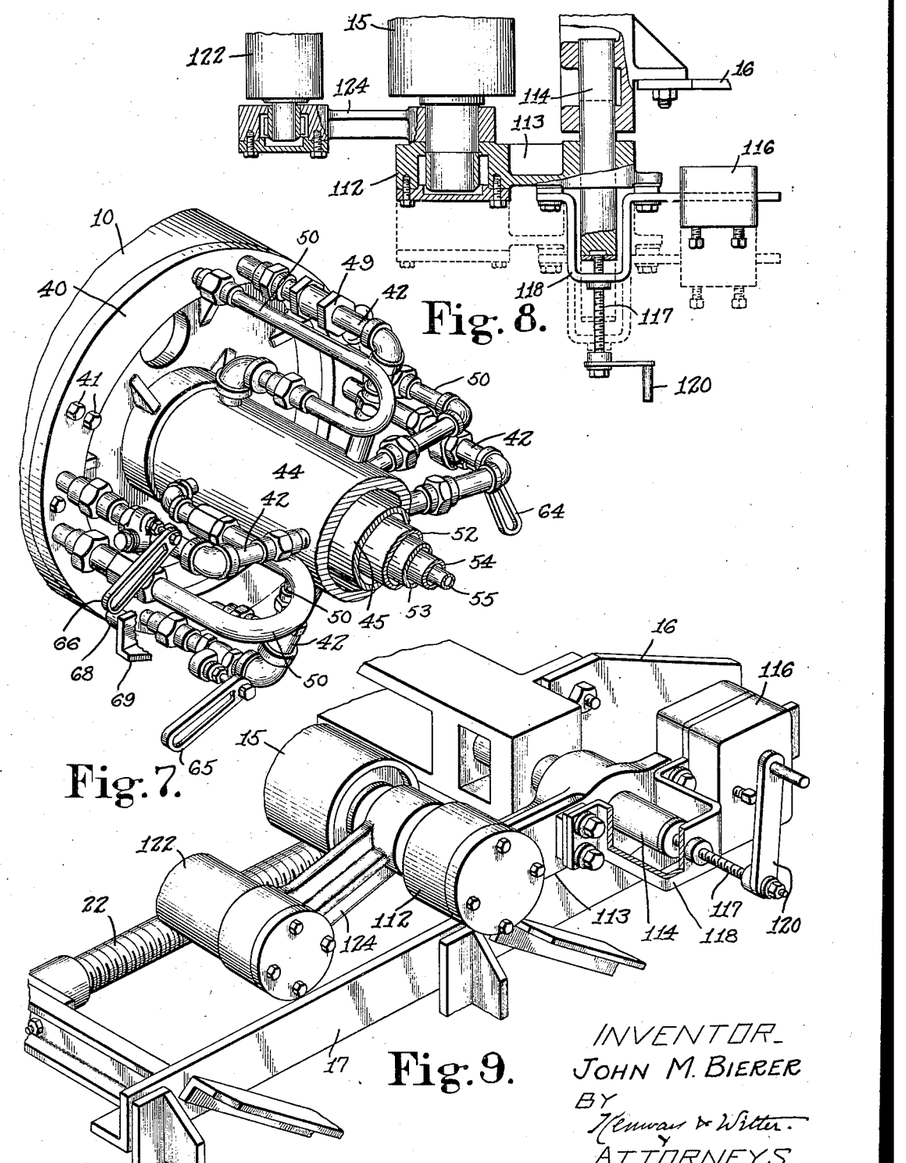
Fig. 7 is an enlarged and fragmentary perspective view of the rear end of the vulcanizing drum.
Fig. 8 is a plan view, partially in section, of the belt supporting rollers and the detachable bearing therefor.
Fig. 9 is a perspective view of the same parts on a larger scale.

It will also be apparent that the outer end of the belt B must likewise be applied to and removed from the roller 15 and a similar removable bearing 112 is provided for this purpose, as shown in Fig. 8. This bearing is carried by a swing frame 113 mounted to pivot on and about a stud 114 set in the carriage 16, the bearing being counter-balanced by a counter-weight 116. The frame may be moved axially of the bearing by a screw 117 journalled in the end of the stud and threaded into a yoke 118 on the frame, a handle 120 being provided on the outer end of the screw. When the frame has been brought to its outer position, indicated in broken lines in Fig. 8, the frame and bearing may be swung to a position clearing the front end of the roller and its axle.

When treating very short belts the roller supporting the outer loop of the belt is necessarily located closely adjacent to the vulcanizing drum 10 and in a position between the rolls 28 and 29. In such case the relatively close proximity of these two rolls precludes the use of the larger belt-supporting roller 15. To provide for such situation, a similar roller 122 is mounted on arms 124 forwardly of the roller 15. This smaller roller is preferably of a diameter adapted to pass between the rolls 28 and 29 and to a position closely adjacent to the surface of the vulcanizing drum.

Figure 1:
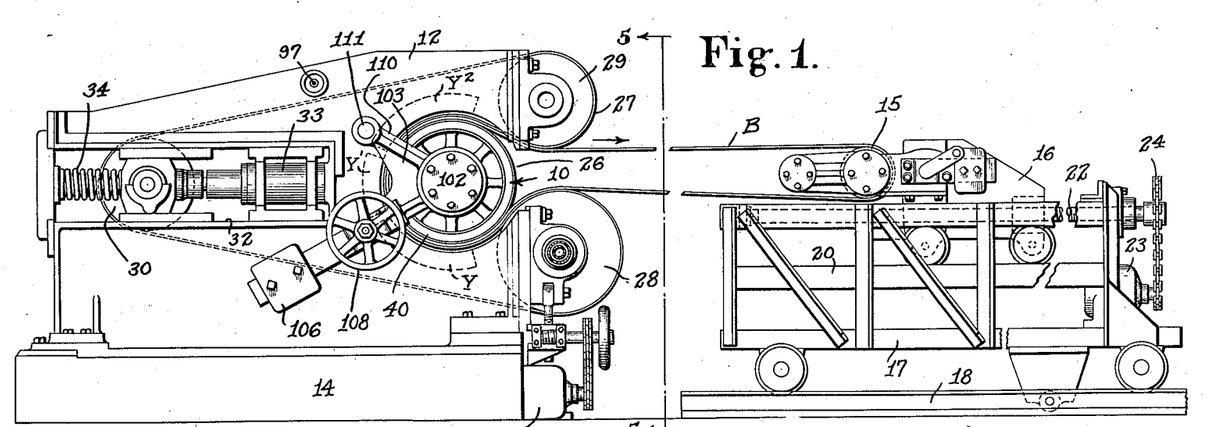
Fig. 1 is a view in front elevation of the machine.

The machine is driven through a large driving gear 125 on the shaft 126 which carries the roll 29 and the operation may be carried out substantially as follows:—The vulcanizing drum 10 is illustrated as substantially in its initial position in Fig. 6 in which position the section X of the drum is located at the open part of the loop formed by the band 27. While the machine is idle and the drum 10 and jacket sections Y, Y¹, and Y² are cold, the bearings 102 and 112 are withdrawn from their drum and roller axles and moved laterally to a position clearing the front ends of the drum 10 and roller 15, and the cables 94 are released whereby permitting the jacket section to move outwardly away from the drum, and the tension on the band 27 is also released. The endless belt B to be treated is now placed over the drum 10 and roller 15, the bearings are then replaced, the band 27 placed under tension and the jacket sections moved inwardly, all to the relative positions illustrated in Fig. 1.

It will be noted that in initial position the drum section X is not in contact with the belt B. With valves 64, 65, and 66, 79, and 80 in closed position so that no steam can pass into sections X¹, X², X³, Y¹, and Y², the valves 48, 76, and 78, are opened whereby passing steam into section X and Y, it being understood that the cold water valves 49 and 87 are closed. Within about three minutes the drum section X and the jacket section Y are brought up to a moderate vulcanizing temperature and the machine is started. The heated section X of the drum immediately comes into contact with the belt B at point A (Fig. 6) and directly thereafter this portion of the belt passes beneath the heated section Y of the jacket, whereupon and whereafter vulcanizing of the belt takes place continuously.

As the drum continues to rotate, the drum section X¹ passes into the open loop position 26 and at a predetermined point therein the valve handle 64 engages the pin 68 and, substantially simultaneously therewith, a pin 82 on one of the rings 83 engages the valve handle 79. Valves 64 and 79 are thereby automatically opened to admit steam into the drum section X¹ and jacket section Y¹, which sections thereupon become heated to vulcanizing temperature by the time the section X¹ contacts with the belt. The valves of the succeeding sections X² and Y² and section X³ are successively opened in like manner and the vulcanizing operation thereof is progressively initiated as soon as the belt is engaged. Thereafter all such valves remain open while the drum continues to rotate and the vulcanizing operation continues.

It will now be apparent that that portion of the belt, beginning at the point A, which has passed over and in contact with the heated drum has been fully vulcanized. When the point A of the belt again approaches contact with the drum, the operator closes both main steam valves 48, and 76, valves 79 and 80 and such valves 49, 64, 65, and 66 as are in communication with these drum sections X, X¹, X² and X³, which have passed beyond the roll 28 (Fig. 6). As the drum continues to rotate and the previously vulcanized portion of the belt, beginning at the point A, again contacts with the drum, the operator opens the cold water valve 43 whereupon water flows through the drum sections which are now contacting with this previously vulcanized portion of the belt and cools the same. When the vulcanized portion of the belt reaches the jacket section Y, the operator opens the cold water valve 87 whereupon water flows through and cools this section of the jacket. In like manner the operator continues progressively to cool the succeeding drum sections, as they leave the top reach of the belt (Fig. 6), by opening the valves and admitting cold water thereinto, and also to cool the jackets Y¹ and Y² by opening the valves 79 and 80 as the vulcanized portion of the belt passes to these jacket sections. Thus the drum and jacket are progressively cooled as the previously vulcanized portion of the belt progresses around the drum, it being understood that the vulcanizing surfaces retain sufficient heat to complete the vulcanization of the remaining portion of the belt forwardly of the point A. When the point A of the belt again leaves the drum the vulcanization of the belt is complete, whereupon the belt is removed and another to be vulcanized is substituted therefor. It will be apparent from Fig. 6 that the steam and the cooling water are admitted to the leading ends of the vulcanizing drum sections and, while I have herein shown the steam and cooling water as entering the following ends of the jackets Y, Y¹, and Y² it will be understood that the entrance thereof may be at the leading ends of such jackets if found desirable.

In the foregoing description it has been assumed that the belt is completely vulcanized in passing once about the vulcanizing drum, and this is entirely practical if the time-contact factor and the degree of heat have been adjusted for effecting a complete cure. If, however, this step of the process has been calculated to impart a one-third or one-half cure of the belt, the movement of the belt is continued for one or more complete passes about the cylinder and in these the belting is brought successively up to the stage of one-half or two-thirds cure and finally fully cured by the same sequence of operations as already described.

Having thus described my invention what I claim as new and desire to secure by Letters Patent of the United States is:

1. A machine for vulcanizing endless belting, including in its construction a vulcanizing drum constructed and arranged to be heated, and controllable means for heating selected areas in the periphery of the drum.

2. A machine for vulcanizing endless belting, including in its construction a sectional vulcanizing drum constructed and arranged to be heated, a sectional heating jacket located adjacent to the periphery of the drum, and controllable means for heating selected sections in the periphery of the drum and the jacket.

3. A machine for vulcanizing endless belting, including in its construction a vulcanizing drum constructed and connected to be heated, and means for initially heating a defined area in the periphery of the drum and for thereafter progressively heating other adjacent areas of the drum.

4. A machine for vulcanizing endless belting, comprising a vulcanizing drum chambered for the reception of steam to heat its peripheral surface, and means for independently controlling the passage of steam to several arcuate sections of the chambered portion of the drum whereby different arcuate sections thereof may be heated in sequence.

5. A machine for vulcanizing endless belting, comprising a vulcanizing drum, an endless pressure band having an open loop therein and passing around a substantial arcuate portion of the drum, means for initially heating an arcuate portion of the drum located at the opening of the loop, and means for automatically causing the heating of successive arcuate portions of the drum as the drum is rotated to pass them across said opening.

6. A machine for vulcanizing endless belting, comprising a vulcanizing drum, a pressure band looped about a portion of the drum, a heating jacket located adjacent to that portion of the band which passes about the drum, means for initially heating a predetermined area in the drum located at the opening of the loop, and means for independently heating selected areas of the drum and of the jacket.

7. A machine for vulcanizing endless belting, comprising a vulcanizing drum, a pressure band having an open loop therein and passing around a substantial arcuate portion of the drum, means for heating the drum independently in sections each of an arcuate dimension substantially equal to the section thereof located at the opening of the loop, and means for controlling the heating of said sections.

8. A machine for vulcanizing endless belting, including in its structure a sectional vulcanizing drum, a pressure band looped about a portion of the drum and leaving a section of its periphery uncovered, means for initially heating the uncovered section of the drum and for thereafter automatically and progressively heating the succeeding sections while the drum is being rotated.

9. A machine for vulcanizing endless belting, comprising a vulcanizing drum, a pressure band having an open loop therein and passing around a substantial arcuate portion of the drum, the drum being chambered for the reception of steam to heat its peripheral surface, and means for controlling the passage of steam independently within arcuate sections of the drum, each of which sections is of an arcuate dimension not substantially greater than the section thereof initially located at the opening of the loop.

10. A machine for vulcanizing endless belting, including in its structure a rotary sectional drum, a pressure band looped about a portion of the drum and leaving a section of its periphery uncovered, steam connections for initially heating the uncovered section of the drum, and steam connections and valves carried by the drum for automatically turning steam into successive sections as they are brought progressively into uncovered position.

11. A machine for vulcanizing endless belting, including in its structure a rotary sectional drum, a pressure band looped about a portion of the drum and leaving a section of its periphery uncovered, steam connections for progressively heating the drum sections as they arrive at said uncovered position, and means for cooling selected sections of the drum.

12. A machine for vulcanizing endless belting, including in its structure a rotary sectional drum, a pressure band looped about a portion of the drum and leaving a section of its periphery uncovered, a sectional heating jacket located adjacent to the band passing about the drum, steam connections for heating the drum sections as they arrive at said uncovered position, and means including valves and operating elements for automatically turning steam into one section of the jacket after another as a heated section of the drum approaches it.

13. In a machine for vulcanizing endless belting, a cylinder for supporting a loop of the belting, a bearing for one end of the cylinder adapted independently to support the cylinder, a second bearing for the other end of the cylinder, a frame carrying the second bearing, means supporting the frame on the machine and permitting movement thereof on its support in directions axially and laterally of the cylinder whereby the second bearing may be shifted to a point out of line with the cylinder, and mechanism cooperating with the frame and body of the machine for moving the frame outwardly axially of the cylinder.

14. In a machine for vulcanizing endless belting, a cylinder for supporting a loop of the belting, a bearing for one end of the cylinder adapted independently to support the cylinder, a second bearing engaging an axle projecting outwardly from the other end of the cylinder, a frame carrying the second bearing, means supporting the frame for bodily and pivotal movement on the machine whereby to release the second bearing from the cylinder and shift it to a point out of line with the cylinder, mechanism cooperating with the frame and the body of the machine for moving the frame outwardly axially of the cylinder, and means for counterbalancing the weight of the second bearing about the axis of said pivotal movement as a center.

15. In a machine for vulcanizing endless belting, a vulcanizing drum and a rotatable roller arranged in spaced relation and adapted respectively to support opposite loops of the belting, means for heating the drum, a bearing engaging one end of the drum and adapted to support the drum independently of the other end thereof, a readily detachable bearing engaging an axle projecting outwardly from the other end of the drum, and a readily detachable bearing engaging an axle projecting outwardly from one end of the roller, detachment of said detachable bearings permitting the application to and removal from the drum and roller of an endless belt.

16. A machine for vulcanizing belting or the like, comprising a vulcanizing drum, an endless band having an open loop portion passing around a substantial arcuate portion of the drum, means for heating the drum, a heating jacket located adjacent to and cooperating with that portion of the band at said arcuate portion of the drum, means for heating the jacket, and means for holding the jacket in close proximity to the band but arranged to permit movement thereof away from the band when applying endless belting to the drum or removing it therefrom.

17. A machine for vulcanizing belting or the like, comprising a vulcanizing drum, a pressure band having an open loop portion passing around a substantial arcuate portion of the drum, means for heating the drum, a segmental heating jacket located adjacent to and cooperating with that portion of the band at said arcuate portion of the drum, means for heating the jacket, means independently supporting each segment of the jacket for movement toward and from the band, and means for holding the segments in close proximity to the band.

18. A machine for vulcanizing belting or the like, comprising a vulcanizing drum, a pressure band having an open loop portion passing around a substantial arcuate portion of the drum, means for heating the drum, a segmental heating jacket located adjacent to and cooperating with that portion of the band at said arcuate portion of the drum, means for heating the jacket, means independently supporting each segment of the jacket for movement toward and from the band, resilient means normally moving the segments away from the band, and means for engaging the segments and holding them in close proximity to the band against the action of the resilient means.

19. A machine for vulcanizing endless belting comprising a vulcanizing drum, two rolls arranged in spaced relation and having their peripheries adjacent to the periphery of the drum, a pressure band passing around the rolls and from thence continuously around a substantial arcuate portion of the drum and forming an open loop adjacent to the drum between the rolls, a carriage disposed oppositely to the open side of the loop, a roller on the carriage in lateral alignment with the drum and adapted to support one loop of an endless belt having its oppositely disposed loop carried by the drum, and a second and smaller belt-supporting roller on the carriage forwardly of the first-named roller and of a diameter adapted to pass between the said two rolls.

20. A continuous vulcanizing machine having a heated vulcanizing drum, a pressure band arranged to maintain material to be vulcanized under pressure upon the circumference of the drum, and a movable heater having an arcuate surface pressed continuously against the outer surface of the band in the area of contact of the band with the material whereby simultaneously heating the band and material in said area and applying pressure thereto.

21. A machine for vulcanizing endless belting, including a heated vulcanizing drum mounted to rotate about its axis and adapted to carry thereon one loop of the belting to be vulcanized, an endless pressure band having a portion thereof associated with the drum in position to press the belting thereonto, means supporting that portion of the pressure band remote from the drum, a carriage movable toward and from the drum and having a roller for supporting the outer loop of the belting, and means whereby the roller may be held in position at predetermined distances from the drum.

22. A machine for vulcanizing endless belting comprising a vulcanizing drum, an endless pressure band having a portion thereof passing continuously around a substantial arcuate portion of the drum and forming an open loop therewith, means supporting that portion of the pressure band remote from the drum, a cylindrical roller disposed oppositely to the open side of the loop in lateral alignment with the drum and adapted to support one loop of an endless belt having its oppositely disposed loop carried by the drum, and screw threaded means for traversing the roller away from the drum to tighten the belt.

23. A machine for vulcanizing endless belting comprising a vulcanizing drum, an endless pressure band having a portion thereof passing continuously around a substantial arcuate portion of the drum and forming an open loop therewith, means supporting that portion of the pressure band remote from the drum, a carriage disposed oppositely to the open side of the loop, a roller on the carriage and located opposite to the drum at said open loop and adapted to support one loop of an endless belt having its oppositely disposed loop carried by the drum, and means for traversing the carriage away from the drum to tighten the belt.

24. A machine for vulcanizing endless belting comprising a vulcanizing drum, two rolls arranged in spaced relation and having their peripheries adjacent to the periphery of the drum, a pressure band passing around the rolls and from thence continuously around a substantial arcuate portion of the drum and forming an open loop portion adjacent to the drum between the rolls, means supporting the pressure band remote from the drum and rolls, a carriage disposed oppositely to the open side of the loop, means for traversing the carriage away from the drum, and a roller on the carriage in lateral alignment with the drum and adapted to support one loop of an endless belt having its oppositely disposed loop carried by the drum.

25. In a machine for vulcanizing endless belting, a cylinder for supporting a loop of the belting, a bearing at one end of the cylinder adapted independently to support the cylinder, a second bearing for an axle projecting outwardly from the other end of the cylinder, a frame carrying the second bearing, a stud carried by the machine parallel to the cylinder and supporting the frame for axial and pivotal movements thereon whereby to release the second bearing from the cylinder and shift the same to a point out of line with the cylinder, screw threaded means for moving the frame axially of the cylinder, and a second stud carried by the machine and adapted to cooperate with and supplementarily support the frame when the second bearing is engaged with said axle.

26. The machine defined in claim 9 wherein the last named means includes valves and cooperating elements for automatically turning steam into said sections as they pass into the open loop upon rotation of the drum.

27. The machine defined in claim 9, plus a chambered heating jacket contacting that portion of the band at said arcuate portion of the drum, and means for conducting steam independently into adjacent sections of the jacket.

28. The machine defined in claim 9, plus a chambered heating jacket contacting with that portion of the band at said arcuate portion of the drum, and means including valves and cooperating elements for automatically and successively turning steam into adjacent sections of the jacket as the heated portion of the drum approaches such sections.

29. In a machine for vulcanizing endless belting, a cylinder for supporting a loop of the belting, a bearing for one end of the cylinder and adapted independently to support the cylinder, a second bearing for the other end of the cylinder, a frame carrying the second bearing, means supporting the frame on the machine for movement in a direction to carry the bearing laterally of its longitudinal axis, and mechanism cooperating with the frame and the body of the machine for moving the second bearing axially from engagement with the cylinder.

30. A machine for vulcanizing endless belting, including a heated vulcanizing drum mounted to rotate about its axis and adapted to carry thereon one loop of the belting to be vulcanized, an endless pressure band having a portion thereof associated with the drum in position to press the belting thereonto, means supporting that portion of the pressure band remote from the drum, a carriage movable toward and from the drum and having a roller for supporting the outer loop of the belting, means whereby the roller may be held in position at predetermined distances from the drum, means rotatably supporting the drum at its ends, and means for temporarily separating the drum and its supporting means at one end thereof to permit endless belting to be placed on and removed from the drum.

31. A machine for vulcanizing endless belting comprising a vulcanizing drum, means rotatably supporting the drum, an endless pressure band having a portion thereof passing continuously around a substantial arcuate portion of the drum and forming an open loop therewith, means supporting that portion of the endless pressure band which is remote from the drum, a carriage disposed oppositely to the open side of the loop, a roller on the carriage and located opposite to said open loop and adapted to support one loop of an endless belt to be vulcanized which has its oppositely disposed loop carried by the drum, and means for traversing the carriage away from the drum to tighten the belt, the drum and its supporting means being constructed and arranged for temporary separation to permit the looping of endless belting over the drum and its removal therefrom.

JOHN M. BIERER.